United States Patent [19]

Nordvall

[11] Patent Number: 4,802,368

[45] Date of Patent: Feb. 7, 1989

[54] MAGNETOELASTIC FORCE TRANSDUCER

[75] Inventor: Jan O. Nordvall, Västerås, Sweden

[73] Assignee: ASEA Aktiebolag, Västerås, Sweden

[21] Appl. No.: 130,545

[22] Filed: Dec. 9, 1987

[30] Foreign Application Priority Data

Dec. 15, 1986 [SE] Sweden ............................. 8605377

[51] Int. Cl.$^4$ ............................................. G01L 1/12
[52] U.S. Cl. ..................................... 73/862.69; 336/20
[58] Field of Search ............. 73/862.69, 779, DIG. 2; 324/209; 336/20

[56] References Cited

U.S. PATENT DOCUMENTS

| 1,906,551 | 5/1933 | DeForest | 324/209 X |
| 3,122,927 | 3/1964 | Chasis | 336/20 X |

FOREIGN PATENT DOCUMENTS

| 89916 | 9/1983 | European Pat. Off. |
| 151267 | 8/1955 | Sweden. |

Primary Examiner—Charles A. Ruehl
Attorney, Agent, or Firm—Watson, Cole, Grindle & Watson

[57] ABSTRACT

A magnetoelastic force transducer is made of two identical, cylindrical bodies of magnetic material which are held together by means of a stud bolt. In an axially extending and concentrically located inner space there is placed a bobbin with two measuring windings connected in opposition and an excitation winding supplied with alternating current. The interior of the transducer is shaped such that a thin cylindrical tubular wall is formed immediately opposite to the respective measuring winding in each one of the bodies. When the transducer is force-loaded via the stud bolt, a compressive stress arises in one of these tubular walls and a tensile stress arises in the other tubular wall. This influences the magnetic conditions such that a signal is obtained from the measuring windings which is proportional to the applied force.

7 Claims, 1 Drawing Sheet

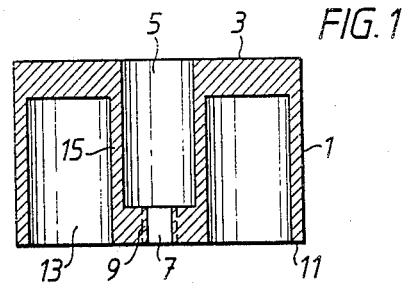
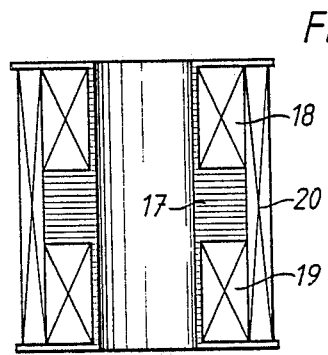
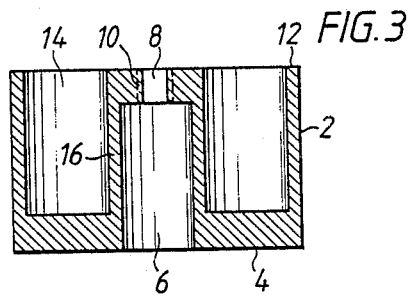
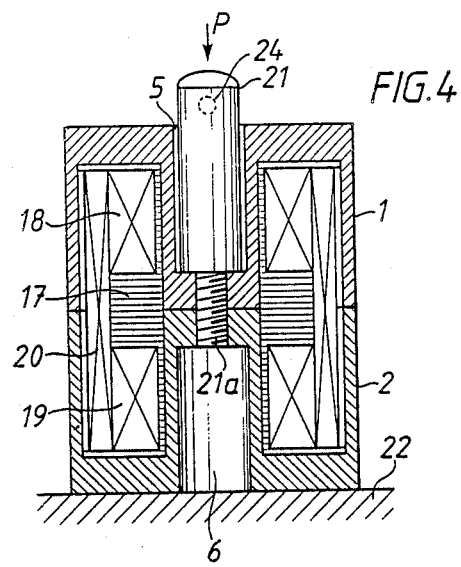
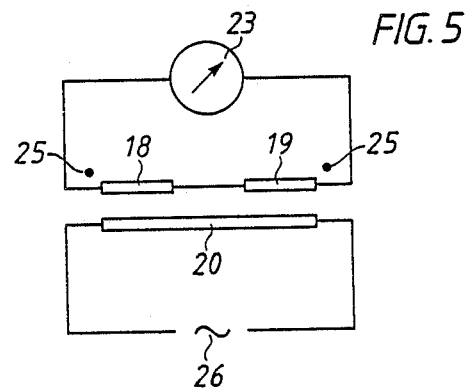

MAGNETOELASTIC FORCE TRANSDUCER

TECHNICAL FIELD

The present invention relates to a magnetoelastic transducer for force measurement. A force transducer according to the invention has a constructive new design, which involves a considerable simplification, from the viewpoints of manufacture and installation, in relation to prior art magnetoelastic force transducers. The need for robust and inexpensive force transducers exists everywhere in engineering and other industries for control and supervision of various processes.

BACKGROUND ART

Magnetoelastic force transducers are previously known from, for example, Swedish Pat. No. 151 267. Such a transducer comprises a force-subjected magnetic core built up of magnetoelastic sheets, which core is provided with four through-holes for two windings located perpendicular one to the other, one winding being an excitation winding adapted to be connected to an a.c. source for generating a magnetic flux in the core, and the other winding being a measuring winding for sensing the magnitude of the magnetic flux passing through the measuring winding. The magnitude of this flux depends on the magnitude of the external force applied to the core.

The design principle with a magnetic core built up of magnetoelastic sheets has—since the evolution of the design featured in Swedish Pat. No. 151 267—been developed and sophisticated in several respects to provide force transducers with improved performance.

An example of the latter is disclosed in European Pat. No. 0 089 916. This shows a magnetoelastic force transducer with a specially formed sheet section with a measuring part formed as a double-bent beam. Such a transducer exhibits very good performance as far as linearity and zero voltage values are concerned.

From the point of view of manufacture, however, the transducers described above require considerable resources in terms of tools for sheet metal forming, punching, winding, gluing, etc.. This also means that these transducers are relatively expensive, in particular in applications where there are no extreme demands for performance. Therefore, from various quarters there has been a long-felt need for a simple, robust and relatively inexpensive force transducer, which is favourable from the manufacturing point of view, for use in installations where the demands for linearity, zero residual voltage, etc., are not too severe.

A magnetoelastic force transducer according to the invention has a constructive design which makes it extremely well suited for automatic series production. This means, inter alia, that the manufacturing costs are considerably lower than for prior art designs.

SUMMARY OF THE INVENTION

A magnetoelastic transducer according to the invention has a core of magnetic material made from two cylindrical and identical bodies. Extending from a first circular end surface of each body a first axial center hole is provided with an axial length somewhat shorter than the length of the cylindrical body. A second axial center hole with a diameter smaller than that of the above-mentioned first center hole is formed in the remaining central part of the cylindrical body. This hole is provided with an internal screw thread.

Extending from the second circular end surface of each cylindrical body, a concentric tubular space is provided having an axial length somewhat shorter than the length of the body. The inner diameter of the tubular space is chosen such that a thin cylindrical tubular wall is formed between this space and the first made hole.

The two cylindrical bodies are designed to be mounted against each other in such a way that the tubular spaces confront each other. The mounting together is performed by means of a stud bolt with a shank diameter adapted to provide clearance in the first made center hole and with a bolt dimension adapted for the threads of the smaller threaded center hole. The shank of the stud bolt should have such a length as to extend somewhat beyond the core of the assembled transducer. In order that the stud bolt should not disturb the magnetic field configuration of the transducer, it is suitably made of a non-magnetic material.

In the total tubular space that is formed when the cylindrical bodies are mounted together there is located a bobbin, the inner diameter of which is dimensioned to fit against the outer diameter of the thin cylindrical tubular wall and the axial length of which corresponds to the axial length of the total tubular space. The bobbin is provided with two measuring windings wound on the bobbin in such a way that each measuring winding will be located, in the axial direction, outside the thin cylindrical tubular wall of a respective different one of the two assembled cylindrical bodies. The bobbin is also provided with an excitation winding disposed outside the measuring windings and extending over the entire axial length of the bobbin.

From a magnetic point of view, the measuring windings are electrically connected in opposition, which also means that the voltages induced in the windings by any change of flux in the core are connected in opposition, the total output voltage being approximately zero when the applied force is zero.

By placing the transducer on one circular end surface against a fixed base and allowing the force to be measured to be applied to the shank of the stud bolt, a compressive stress is obtained in the thin cylindrical tubular wall which is positioned nearest to the base, and a tensile stress is obtained in the thin cylindrical tubular wall which faces the force-applying side. This influences the magnetic conditions in a known manner for magnetoelastic transducers, and a signal proportional to the applied force can be obtained from the measuring windings.

The transducer can be adapted in a very simple way for measuring tensile forces. This can be done, for example, by providing the stud bolt with a loop or the like.

A magnetoelastic transducer according to the invention will, with a fair probability, exhibit a certain residual voltage at zero applied force and will have a certain linearity imperfection. However, there are applications in which such a transducer is justified because of its simplicity, robustness and inexpensiveness. Examples of these cases are when the force measurement is to take place within a relatively narrow force range or when the transducer is to operate as a simple overload protective device.

BRIEF DESCRIPTION OF THE DRAWING

The invention will now be described, by way of example, with reference to the accompanying drawing, in which:

FIG. 1 shows the first of two identical, cylindrical bodies that are included in a magnetoelastic force transducer according to the invention, FIG. 2 shows a bobbin on which two measuring windings and one excitation winding of the transducer are wound, FIG. 3 shows the second of the two identical, cylindrical bodies that are included in the magnetoelastic transducer according to the invention, FIG. 4 shows how the component parts of FIGS. 1, 2 and 3 are assembled to create a magnetoelastic transducer according to the invention, and FIG. 5 shows a wiring diagram for the windings included in the transducer of FIG. 4.

DESCRIPTION OF THE PREFERRED EMBODIMENTS

The construction of a magnetoelastic force transducer according to the invention will be clear from a study of the accompany drawing. FIGS. 1 and 3 show two identical, cylindrical 1 and 2 which together will provide the magnetic core of the transducer and are thus fabricated from an appropriate magnetoelastic material. First axial center holes 5 and 6 are formed in the bodies 1 and 2 and extend from circular end surfaces 3 and 4, the axial length or axial depth of these holes 5, 6 being somewhat shorter than the axial length of the respective cylindrical body 1 or 2.

A second axial center hole 7, 8 is provided in the remaining central core of each body 1 and 2, each hole 7, 8 being provided with respective threads 9, 10.

Extending from the respective end surface 11 and 12 of each cylindrical body 1 and 2, concentric annular spaces 13 and 14 are provided, the axial length of each of these spaces being somewhat shorter than the length of the cylindrical bodies 1 and 2. In this way, a thin cylindrical tubular wall 15 and 16, respectively, is formed between the hollow spaces 5, 13 and 6, 14, respectively.

FIG. 2 shows a cylindrical bobbin 17 on which measuring windings 18 and 19 and an excitation winding 20 are wound. The inner diameter of the bobbin 17 is dimensioned to be a slide fit against the outer surface of the cylindrical tubular walls 15 and 16.

FIG. 4 shows how a magnetoelastic transducer is assembled from the cylindrical bodies 1 and 2 from FIGS. 1 and 3 and the bobbin 17 from FIG. 2. To keep the two cylindrical bodies 1, 2 pressed against each other, the mounting is performed with the aid of a stud bolt 21, to which the force P to be measured is applied. The shank diameter of the stud bolt 21 is adapted to provide clearance in one of the center holes 5 or 6 (in hole 5 as shown in FIG. 4), and the stud bolt 21 has a reduced diameter end portion 21a provided with a screw thread corresponding to the threads 9 and 10 in the holes 7 and 8. The stud bolt can be made of non-magnetic material.

During force measurements, the transducer would be placed on a force-resisting base 22 so that the bodies 1 and 2 can be distorted by the application of the force P.

For measuring tensile forces, the stud bolt 21 can be provided with a loop or the like (e.g. the hole shown dotted at 24 in FIG. 4).

The basic design of the transducer is shown in FIG. 4. Within the scope of the invention several possibilities exist for supplementing and changing constructive elements to a certain extent. To guide the shank of the stud bolt 21, the hole 5 can be provided with a bearing bushing of a suitable low friction material. The body 2 (or both bodies) can suitably be provided with a flange of some kind or some other means can be provided for fixing the transducer to the base 22.

The manner in which the windings are energised is shown in FIG. 5. The dots 25 indicate that the measuring windings 18 and 19 are connected in opposition as is conventional for force transducers of this type. The excitation winding 20 is connected to an a.c. source 26, and in the usual manner with a magnetoelastic force transducer, generates the magnetic flux in the core parts 1 and 2, the force distortion of which is sensed by the windings 18 and 19. An electrical output signal proportional to the applied force P, is generated in the windings 18, 19 and is fed to a current- or voltage-measuring instrument 23 which can be calibrated directly in force units and is used for reading the force applied at each particular moment.

What is claimed is:

1. A magnetoelastic force transducer comprising a core of solid magnetoelastic material defining a closed magnetic circuit, an excitation winding surrounding part of said core and adapted to be fed with alternating current for generating a magnetic flux in the core and two measuring windings each surrounding parts of the core and adapted together to sense changes in the magnetic flux in the core when the latter is loaded with a force to be measured, characterized in that:

the closed core includes two hollow cylindrical bodies each having outer and inner end faces which are connected together centrally and axially over their inner faces to provide an inner tubular space, a bobbin, on which the measuring windings and the excitation winding are wound located in said tubular space, first holes extending axially from the outer end faces of the cylindrical bodies, the axial length of each said first hole being shorter than the axial length of the respective body, second holes extending from the inner end faces of the cylindrical bodies and communicating with the respective first hole, a stud bolt inserted in one of said first holes and both of said second holes for securing together said two bodies, the diameter of said first hole in which the stud bolt is located being greater than the diameter of the stud bolt to provide clearance around the stud bolt in said first hole, and said second holes are provided in a central part of the bodies where said inner faces of the two bodies are in contact.

2. Magnetoelastic force transducer according to claim 1, in which said two bodies are identical and are screwed together by said stud bolt.

3. Magnetoelastic force transducer according to claim 2, in which each measuring winding is located within a respective one of the two bodies and the measuring windings, in the axial direction, are placed outside of a cylindrical tubular wall which is formed between the first holes and the inner concentric, tubular space.

4. Magnetoelastic force transducer according to claim 2, in which the excitation winding extends axially over the entire length of the bobbin.

5. Magnetoelastic force transducer according to claim 2, in which the stud bolt is made of a non-magnetic material and is longer than the length of the first hole in which it is located.

6. Magnetoelastic force transducer according to claim 1, in which each measuring winding is located within a respective one of the two bodies and the measuring windings, in the axial direction, are placed outside of a cylindrical tubular wall which is formed between the first holes and the inner concentric, tubular space.

7. A magnetoelastic force transducer having a magnetic core formed from two identical, cylindrical bodies which are held together and define an axially extending and concentrically located inner space, a bobbin located in said inner space and supporting two measuring windings connected in opposition, and an excitation winding supplied with alternating current, the interior of the transducer core being shaped such that a thin cylindrical tubular wall is formed immediately opposite to the respective measuring winding in each one of said two cylindrical bodies, a stud bolt extending axially of said two cylindrical bodies and holding said two cylindrical bodies together in the vicinity of said tubular walls, whereby when the transducer is influenced, via the stud bolt, by an externally applied force, a compressive stress arises in one of said tubular walls and a tensile stress arises in the other of said tubular walls to influence the magnetic conditions in the core such that a signal is obtained from the measuring windings which is proportional to the applied force.

* * * * *